United States Patent [19]
Kobayashi et al.

[11] Patent Number: 5,437,018
[45] Date of Patent: * Jul. 25, 1995

[54] EMULATION OF SEMICONDUCTOR AND MAGNETIC AUXILIARY STORAGE DEVICES WITH SEMICONDUCTOR MEMORY

[75] Inventors: Junichi Kobayashi; Hiroaki Tateno; Masayuki Ikeda; Shogo Samejima, all of Suwa, Japan

[73] Assignee: Seiko Epson Corporation, Japan

[ * ] Notice: The portion of the term of this patent subsequent to Jul. 6, 2010 has been disclaimed.

[21] Appl. No.: 86,417

[22] Filed: Jul. 2, 1993

Related U.S. Application Data

[62] Division of Ser. No. 513,600, Apr. 24, 1990, Pat. No. 5,226,168.

[30] Foreign Application Priority Data

| Apr. 25, 1989 | [JP] | Japan | 1-105008 |
| Jul. 28, 1989 | [JP] | Japan | 1-195866 |
| Jul. 28, 1989 | [JP] | Japan | 1-195867 |
| Aug. 28, 1989 | [JP] | Japan | 1-221237 |

[51] Int. Cl.⁶ ..................... G06F 12/10; G06F 13/14
[52] U.S. Cl. ................... 395/400; 395/425; 395/725; 364/DIG. 1
[58] Field of Search ................ 395/400, 425, 725

[56] References Cited

U.S. PATENT DOCUMENTS

| 4,456,971 | 6/1984 | Fukuda et al. | 395/500 |
| 4,829,169 | 5/1989 | Watanabe | 235/492 |
| 4,896,262 | 1/1990 | Wayama et al. | 395/500 |
| 4,984,149 | 1/1991 | Iwashita et al. | 395/425 |
| 5,119,486 | 6/1992 | Albonesi | 395/425 |
| 5,226,168 | 7/1993 | Kobayashi et al. | 395/800 |

FOREIGN PATENT DOCUMENTS

| 2093236 | 8/1982 | United Kingdom . |
| 2172126 | 9/1986 | United Kingdom . |

Primary Examiner—Jack B. Harvey
Assistant Examiner—Michael A. Whitfield
Attorney, Agent, or Firm—Eric B. Janofsky

[57] ABSTRACT

A compact, low power consumption, light weight, highly reliable and high speed information processing system is provided by employing a semiconductor auxiliary storage device in lieu of conventional magnetic storage or memory elements, such as floppy or hard disks. An access request to such a magnetic storage or memory element is converted to an access request for the semiconductor auxiliary storage which uses semiconductor integrated circuits without requiring any modification of existing programs, such as, application software and disk operating systems. A memory circuit in the semiconductor auxiliary storage comprises ROM and RAM, and a portion of the ROM contents is copied into the RAM so that access modification for programs and data is permitted while the basic program and data is retained in a nonvolatile manner.

7 Claims, 11 Drawing Sheets

| M K 0 | M K 1 | M K 2 | M K 3 | | | | | | | | | | | | |

MK 0: RAM
MK 1: MASK ROM
MK 2: P-ROM
MK 3: EEPROM

FIG.-3A

| W C 0 | W C 1 | W C 2 | W C 3 | W C 4 | W C 5 | W C 6 | W C 7 | | | | | | | | |

| U C 0 | U C 1 | U C 2 | U C 3 | U C 4 | U C 5 | U C 6 | U C 7 | | | | | | | | |

| ADDRESS | C | H | R | N | |
|---|---|---|---|---|---|
| 000 | 00 | 00 | 08 | 02 | TRACK 0 ID INFORMATION |
| 004 | 00 | 01 | 08 | 02 | TRACK 1 ID INFORMATION |
| 008 | 01 | 00 | 08 | 02 | TRACK 2 ID INFORMATION |
| 00C | 01 | 01 | 08 | 02 | TRACK 3 ID INFORMATION |
| 010 | 02 | 00 | 08 | 02 | TRACK 4 ID INFORMATION |
| 27C | 4F | 01 | 08 | 02 | LAST TRACK ID INFORMATION 60 |
| 3FC | 4F | 01 | 08 | 02 | ENTIRE TRACK ID INFORMATION 61 |

EMULATION OF SEMICONDUCTOR AND MAGNETIC AUXILIARY STORAGE DEVICES WITH SEMICONDUCTOR MEMORY

This application is a divisional application of patent application, Ser. No. 07/513,600, filed Apr. 24, 1990, now U.S. Pat. No. 5,226,168.

BACKGROUND OF THE INVENTION

This invention relates generally to an information processing system of a relatively small size such as a personal computer, and more particularly to an information processing system having compact high speed auxiliary storage for data and programs.

Figure 14:
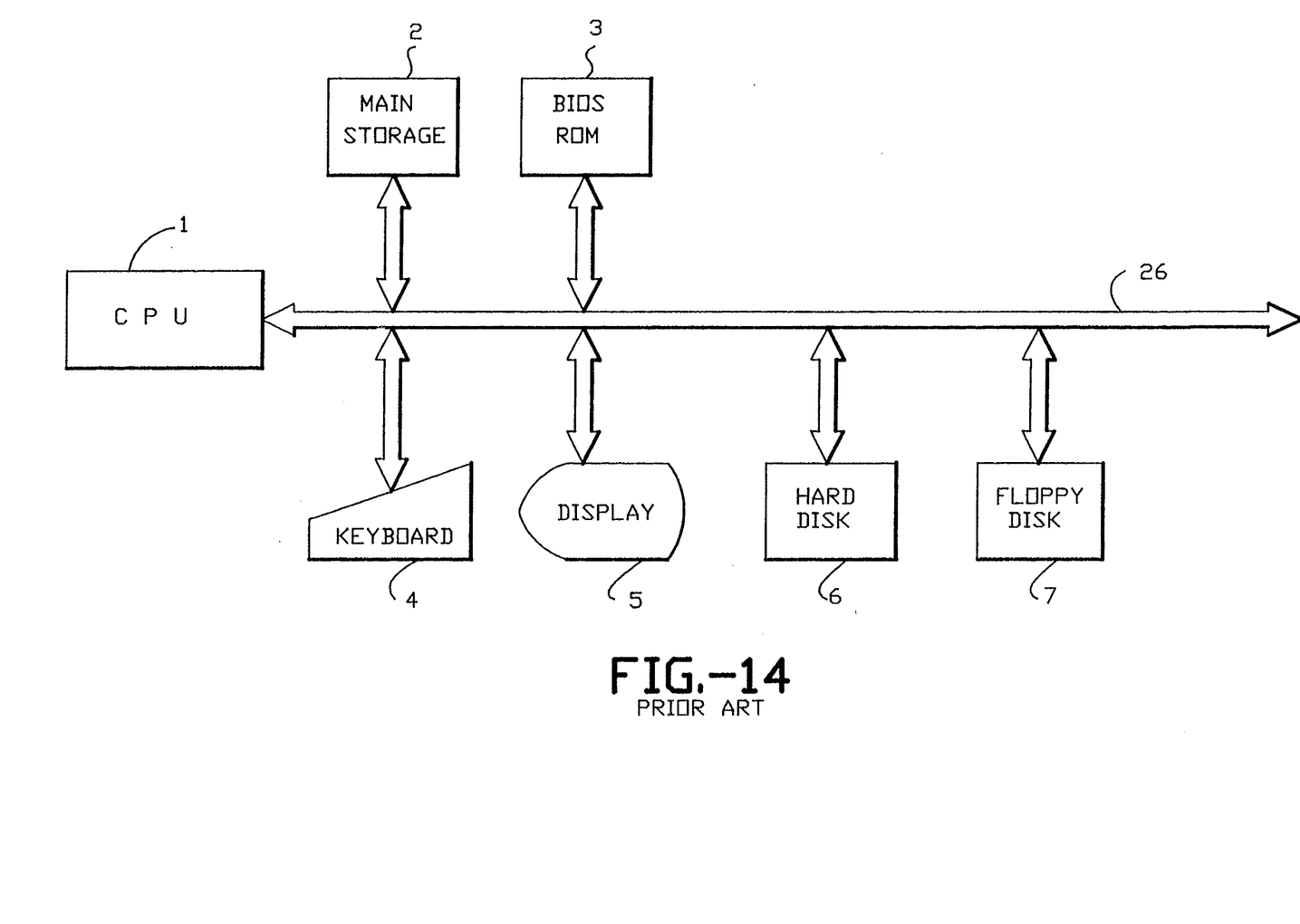
FIG. 14 is a block diagram of a prior art information processing system.

A conventional information processing system is generally configured as shown in FIG. 14. Such a system comprises a central processing unit (CPU) 1 which is the heart of the system. CPU 1 is connected through system bus 26 to main storage 2 where programs and data transferred from the auxiliary storage and intermediate results of program execution are stored, read-only memory (ROM) 3 which stores a basic input/output system (BIOS), keyboard 4 which functions as an input device to the system, display 5 which functions as an output device, a hard disk 6, and a floppy disk 7 which function as auxiliary storage for programs and data.

When power is applied to the system, the system is reset and initialized and CPU 1 executes an initial load program (ILP) stored in BIOS ROM 3 to transfer other programs from hard disk 6 or floppy disk 7 to main storage 2. Thereafter, CPU 1 executes programs transferred to main storage 2 to accomplish the objectives of the programs.

Magnetic storage such as hard disk 6 or floppy disk 7 which are employed as auxiliary storage has a limit in terms of its possible size, weight and power consumption reduction. As a result, the presence of magnetic storage imparts a large restriction on the realization of a compact information system featuring actual portability.

Since the prior art floppy disk or hard disk drives include a mechanical rotary portion and a mechanical operation for moving a read/write head relative to a magnetic medium, access time can be necessarily long and the operation of the drive slow. Further, the mechanical operation involved during the access operation is noisy.

Beside the forgoing disadvantages, it is known that magnetic storage is relatively weak with respect to strong magnetic fields and high temperature and humid environments.

In order to avoid the problems encountered with magnetic storage, attempts have been made to use semiconductor based storage by following two different approaches. In the first approach, an application program, i.e., a data processing program which allows a user to visually interact with the program and confirm results, switches banks of the semiconductor auxiliary storage and access to the semiconductor auxiliary storage is accomplished deemed as a part of the main system storage. In the second approach, the access is made through a device drive program, i.e., a device driver, as a specific auxiliary storage and functions as a part of the operating system (OS).

However, in the first approach, the application program is designed to have a high dependency on a particular type and kind of memory. An existing application program is usually created and prepared on the assumption that a hard or floppy disk is employed as the auxiliary storage. Thus, it is necessary to modify the application program so that it may be employed with semiconductor type auxiliary storage.

In the second approach, after the device driver is activated, the semiconductor storage device is set in its activated condition. A BOOT program is stored in the semiconductor device and the main body of software cannot be set up as part of establishing an active condition. Therefore, it is not possible to store the OS itself in semiconductor auxiliary storage, nor to incorporate a medium copy program, i.e., copied into such storage, or from a floppy disk to floppy disk and, further, is dependent on a BIOS which is highly dependent on the OS.

It is an object of the present invention to solve the above mentioned problems.

It is another object of this invention to provide a compact, light weight, highly reliable, and high speed information processing system while permitting the utilization of existing software applications and programs created and written for use with particular conventional memory devices, such as floppy disk or hard disk magnetic memories.

SUMMARY OF THE INVENTION

According to this invention, an information processing system constructed according to the present invention employs a semiconductor type auxiliary storage. A basic input/output program stored in the main body of the system accesses the semiconductor auxiliary storage when it receives an address request for magnetic type auxiliary storage or memory devices, which request originates from the execution of one or more host programs. The accessing is accomplished by translating the address for the magnetic storage into an address for the semiconductor auxiliary storage. The address translation is in turn accomplished by utilizing ID information for the magnetic storage which has previously been written into a predefined portion of the semiconductor auxiliary storage. The basic input/output program converts the access request for magnetic storage received from application software or a disk operating system (DOS) into an access request for semiconductor auxiliary storage and executes the request. An address for the semiconductor auxiliary storage is obtained by reading out corresponding ID information based on the address for the magnetic storage and processing the ID information and the address for the magnetic storage into a predetermined mathematical relationship.

It is preferred that the semiconductor auxiliary storage contains both read-only storage and erase/write storage capability and that the information processing system includes means for copying a portion of the contents of the read-only storage of the semiconductor auxiliary storage area into the erase/write storage. When an access is made to the semiconductor auxiliary storage having a portion of the contents of the read-only storage copied into the erase/write storage, it is preferred that the information processing system includes elements for translating physical addresses of a source area to a physical address of a target area. When the portion of the contents of the read-only storage in the semiconductor auxiliary storage has been copied into the erase/write storage and an access request is issued to the ROM source area, access is effected by employing a sum of the base address and a value determined by the capacity of the copied into area as a physical address for the erase/write area. In this manner, access is effected for the target storage area. Further, when an access is made to the semiconductor auxiliary storage, means may be provided for determining whether the semiconductor auxiliary storage is to be handled as floppy disk type or hard disk type magnetic storage based on a determination of the capacity of the semiconductor auxiliary storage.

It is preferable that the semiconductor auxiliary storage be constructed for easily removable mounting in the information processing system.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
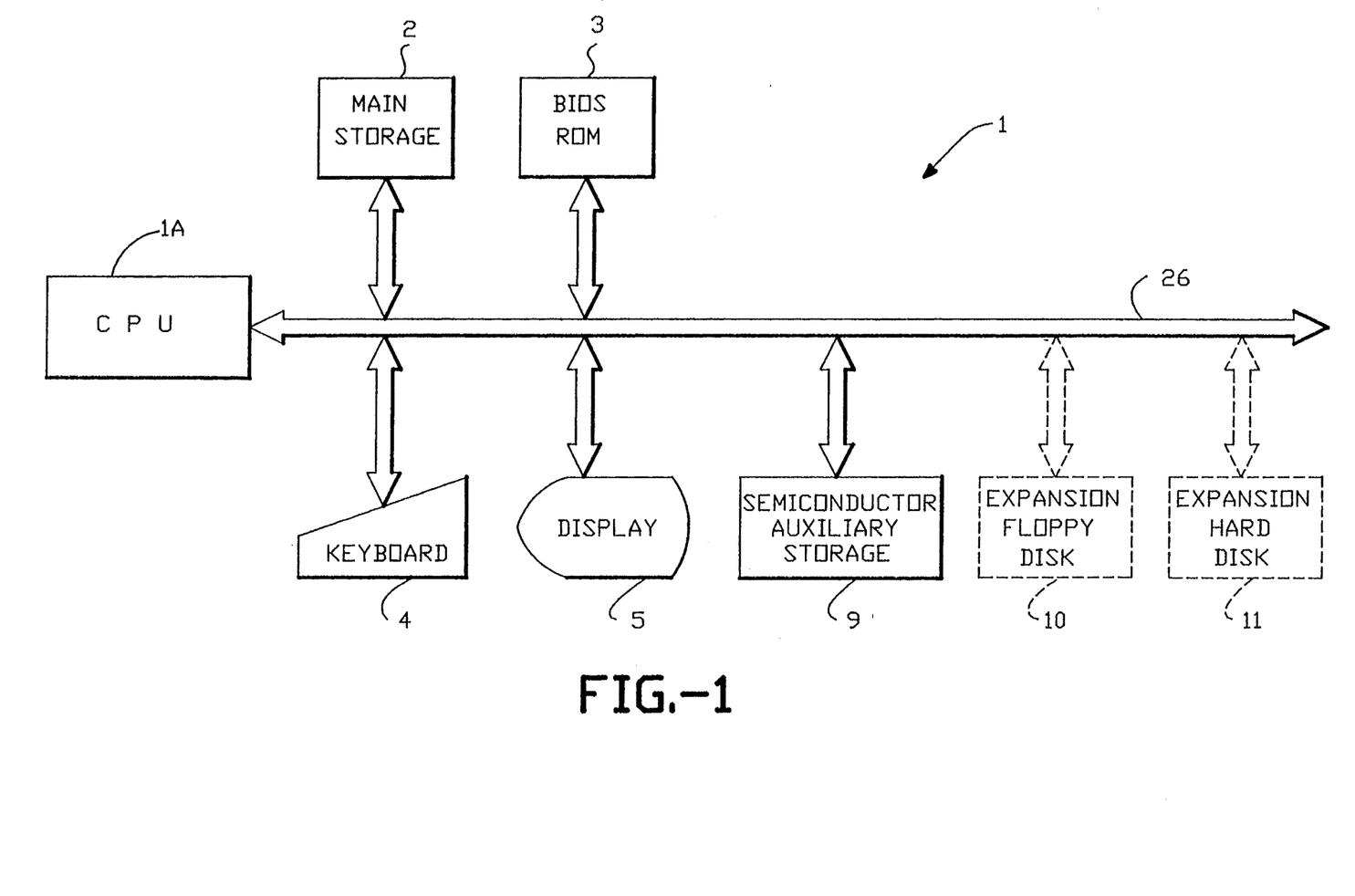
FIG. 1 is a block diagram of one embodiment of an information processing system comprising the present invention.

Referring now to FIG. 1 an information processing system 1 constructed according to this invention is shown comprising CPU 1A, main storage 2, BIOS ROM 3, keyboard 4, display 5, semiconductor storage 9, expansion floppy disk 10 and expansion hard disk 11 all connected to system bus 26. Main storage 2 and BIOS ROM 3 are sometimes referred to collectively as the main storage of system 1 but they are referred to separately herein.

CPU 1, main storage 2, keyboard 4, and display 5 are identical to those employed in the conventional information processing system shown in FIG. 14. The physical structure of BIOS ROM 3 is also identical to a conventional BIOS but the program contents stored therein differ in part because of the necessity to drive and control semiconductor auxiliary storage 9 instead of hard disk 6 and floppy disk 7 as in a conventional system. Expansion floppy disk 10 and expansion hard disk 11 may be added as required in order to support the operation of semiconductor auxiliary storage 9. For example, these expansion disks may be added when semiconductor auxiliary storage 9 is insufficient alone for meeting the memory capacity required for implementing auxiliary storage. On the other hand, these expansion disks are not always necessary.

Figure 2:
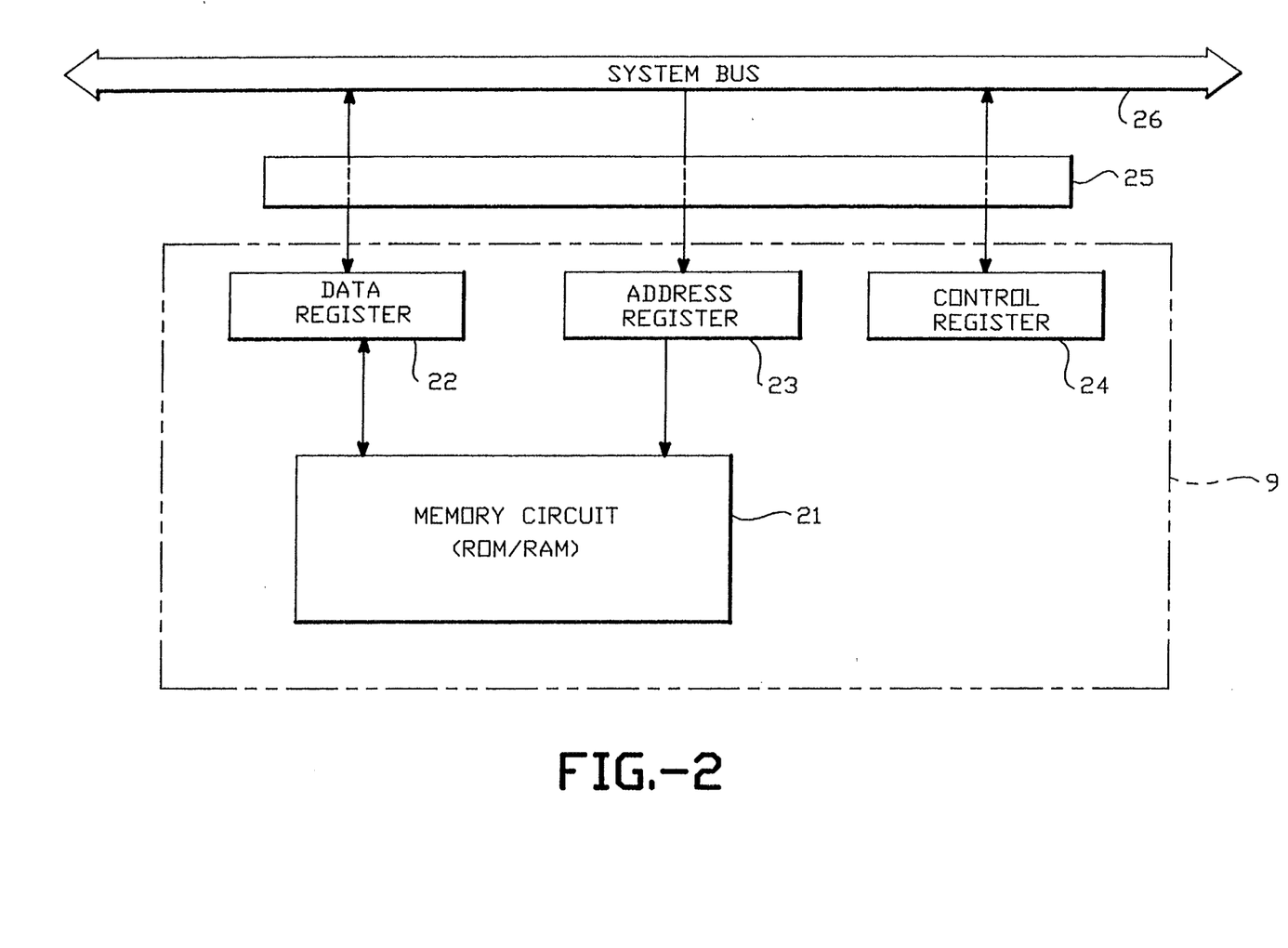
FIG. 2 is a block diagram of an internal configuration of semiconductor auxiliary storage employed relative to this invention.

FIG. 2 is a block diagram of an internal configuration of semiconductor auxiliary storage 9. Semiconductor auxiliary storage 9 comprises memory circuit 21 including a semiconductor integrated circuit, data register 22, address register 23, and control register 24. Memory circuit 21 contains two types of memories: a read-only memory (ROM) and an erase/write memory (RAM). Semiconductor auxiliary storage 9 is physically supported on a structure generally referred to as an IC card. It has a card-like plate structure, and when it is plugged into a connector 25 connected to system bus 26, electrical connection is made to system bus 26. In FIG. 2, only one semiconductor auxiliary storage 9 is illustrated for purposes of simplification but a plurality of such storage structures are usually provided so that a large amount of data may be stored among semiconductor auxiliary storages, or separate semiconductor auxiliary storages are employed for storing software programs as well as for storing data.

The functional operation of auxiliary storage 9 is generally as follows. Address register 23 designates an address in memory circuit 21. A start address for use by CPU 1 in accessing memory circuit 21 is set by CPU 1 in address register 23 through system bus (I/O bus) 26. After the start address has been set in address register 23, data is written to data register 22 and the data is automatically written into that address in memory circuit 21. When the data is written into data register 22, address register 23 is automatically incremented so that data can be written to the next address. Similarly, when the start address is set in address register 23 and data is read from data register 22, the data is automatically read from that address of memory circuit 21. When the data is read, address register 23 is automatically incremented and data can be read out from the next address.

Figure 3A:
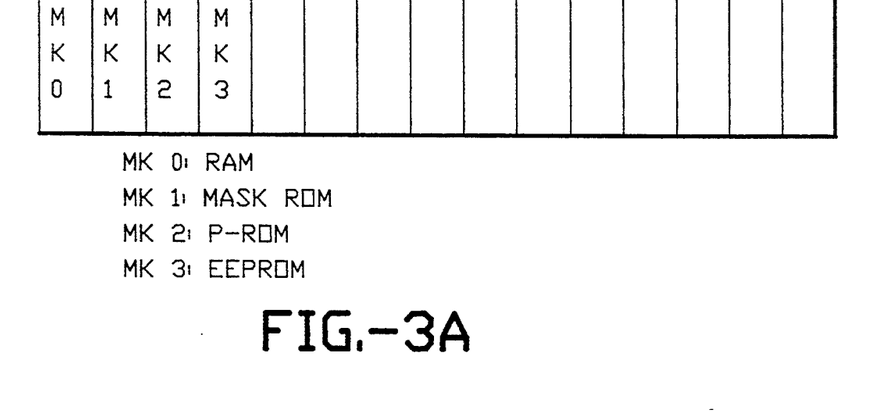
FIGS. 3A–3C illustrate stored status of capacity information by memory type in a control register.
Figure 3B:
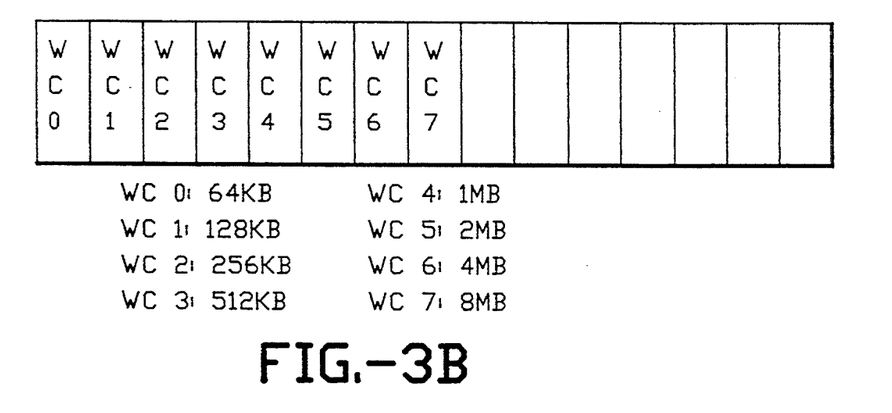
Figure 3C:
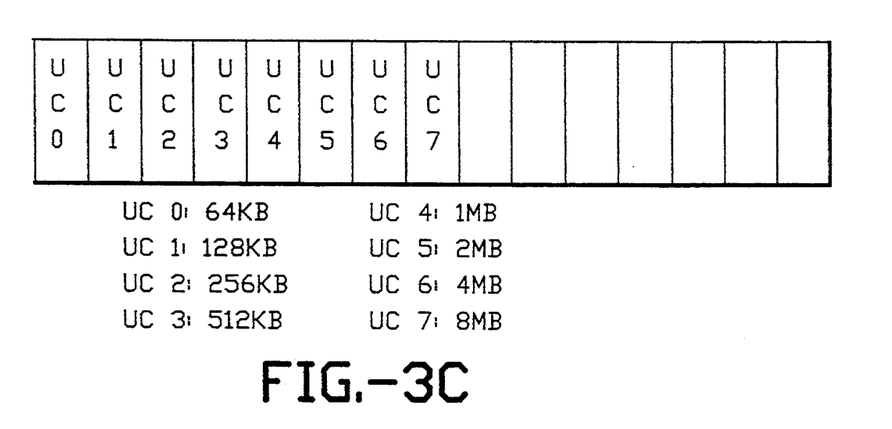

Control register 24 stores an identification code or device information indicative of the memory type of semiconductor auxiliary storage 9. FIGS. 3 A–C show a storage or contents status in control register 24 of the memory capacity by memory type which is a portion of the relevant device information for semiconductor auxiliary storage 9. FIG. 3A shows a type register which indicates the memory type for memory circuit 21. When bit 0 (MK0) of the register is "1", this indicates that the memory type for memory circuit 21 is a RAM. Similarly, bit 1 (MK1) indicates a mask ROM, bit 2 (MK2) indicates a P-ROM, and bit 3 (MK3) indicates an EEPROM.

FIG. 3B shows a capacity register which indicates an erase/write memory capacity for memory circuit 21. When bit 0 (WC0) of the register is "1", this indicates that the erase/write capacity is 64 kilo bytes (KB). Similarly, bit 1 (WC1) indicates 128 KB, bit 2 (WC2) indicates 256 KB, bit 3 (WC3) indicates 512 KB, bit 4 (WC4) indicates 1 MB, bit 5 (WC5) indicates 2 MB, bit 6 (WC6) indicates 4 MB, and bit 7 (WC7) indicates 8 MB.

FIG. 3C shows a capacity register which indicates the read-only memory (ROM) capacity of memory circuit 21. When bit 0 (VC0) of this register is "1", this indicates that the ROM capacity is 64 KB. Similarly, bit 1 (UC1) indicates 128 KB, bit 2 (UC2) indicates 256 KB, bit 3 (UC3) indicates 512 KB, bit 4 (UC4) indicates 1 MB, bit 5 (UC5) indicates 2 MB, bit 6 (UC6) indicates 4 MB, and bit 7 (UC7) indicates 8 MB. The contents of those registers are detected by reading out a specific I/O port address of the information processing system 1 and the memory type and the memory capacity of semiconductor auxiliary storage 9 which is currently loaded can be determined based on the contents of these registers.

As previously indicated, semiconductor auxiliary storage 9 is removably mounted onto system bus 26 through connector 25. Auxiliary storage 9, therefore, may be exchanged for use relative to each program or data stored in auxiliary storage 9 as in the case of a conventional floppy disk. Since auxiliary storage 9 is of a card shape, by utilizing semiconductor integrated circuits for memory storage, it is easy to transport and handle. Since a ROM is used entirely or partially in memory circuit 21, a single piece of software may be copied in volume as compared to one-to-one copy in the case of a floppy disk. Accordingly, this approach is effective for the distribution of software.

The operation of information processing system 1 according to the present embodiment will now be explained.

Figure 4:
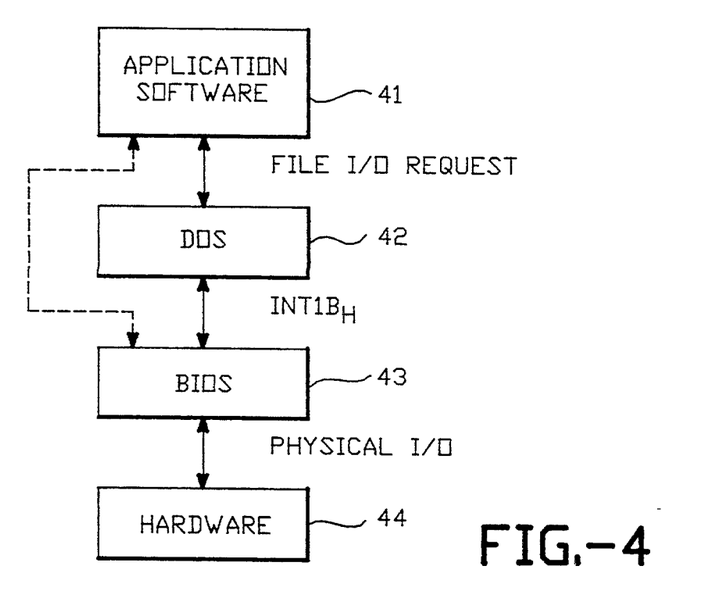
FIG. 4 is a hierarchy block diagram of the system configuration for the embodiment shown in FIG. 1.

FIG. 4 shows a hierarchy type block diagram of the system configuration of system 1 relative to operation in a file access mode. Application software 41 exists at the top level of the hierarchy. Next is disk operating system (DOS) 42 which handles software interruptions due to file input/output requests from application software 41. Below DOS 42 is a basic input/output system (BIOS) 43 which is firmware that controls the lower level input/output operations relative to operation of hardware 44. The general configuration of hardware 44 is shown in FIG. 1. CUP 1 may, for example, be an Intel 16 bit microprocessor 8086. DOS 42 may be Microsoft MS-DOS. BIOS 43 may be one of the input/output systems of the disk requested by the software interrupt INT1B$_H$ from DOS 42. BIOS 43 is stored in BIOS ROM 3 together with an IPL and it operates under the control of CPU 1. DOS 42 and application software 41 are generally stored in semiconductor auxiliary storage 9 and they are transferred to main storage 2 and executed by CPU 1. DOS 42 may be stored in BIOS ROM 3.

When the information processing system shown in FIG. 1 is started, CPU 1 executes the IPL stored in BIOS ROM 3 and transfers DOS 42 stored in semiconductor auxiliary storage 9 to main storage 2. Then, CPU 1 transfers application software 41, also stored in semiconductor auxiliary storage 9, to main storage 2, and the application software is executed under the control of DOS 42.

Application software 41 and DOS 42 are prepared on the assumption that the magnetic storage, such as the floppy or hard disk, is employed as auxiliary storage. Accordingly, BIOS 43 is requested by DOS 42 or application software 41 to access the floppy disk or hard disk. However, BIOS 43 converts the access request for magnetic storage to an access request for semiconductor auxiliary storage 9 in the following manner. Accordingly, DOS 42 and application software 41 see the auxiliary storage as the magnetic storage but, in fact, it is semiconductor auxiliary storage 9. In other words, in the present system, semiconductor auxiliary storage 9 is treated as if it is the magnetic storage or memory means. As a result, information processing system 1 makes use of existing application software without any need or requirement for changing its contents including any adaptation to interface with semiconductor auxiliary storage 9.

Figure 5:
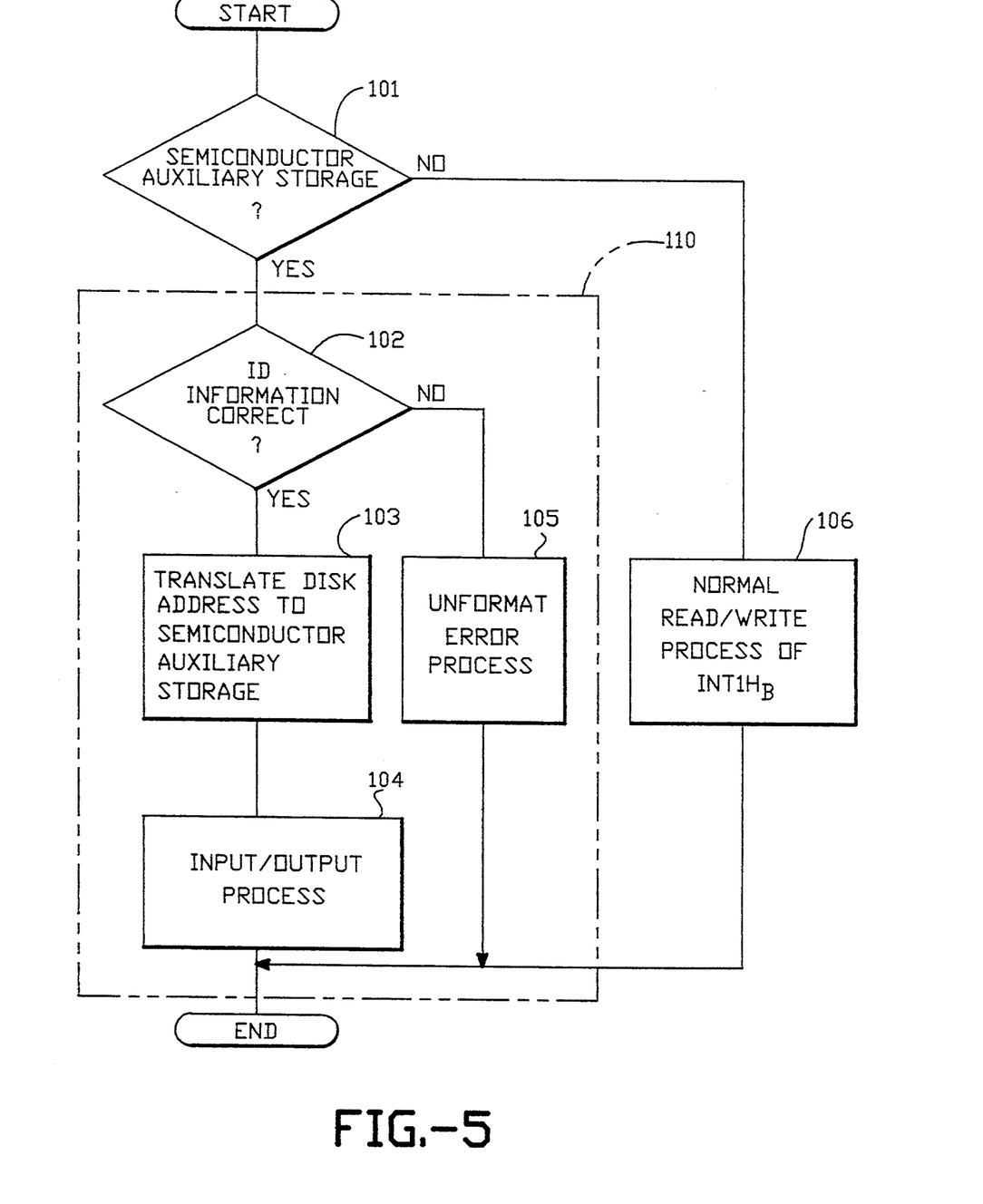
FIG. 5 is a flow chart of read and write processing for the BIOS to a software interrupt INT1H$_H$ from a DOS.

FIG. 5 is a flow chart of the read and write processing of BIOS 43 for software interrupt INT1B$_H$ from DOS 42. When application software 41 issues a file input/output request to DOS 42, DOS 42 determines what drive is associated with that file and issues the software interrupt, INT1B$_H$, to BIOS 43. DOS 42 requests BIOS 43 for access to either the floppy disk or the hard disk. BIOS 43 determines the drive associated with the request (step 101), i.e., it determines a drive number and determines if the request is to semiconductor auxiliary storage 9, which is treated as if it were the floppy disk or the hard disk, or to expansion floppy disk 10 or to expansion hard disk 11. If the request is for access to expansion floppy disk 10 or expansion hard disk 11, the normal read/write process for software interrupt INT1B$_H$ is executed (step 106). If the request is for access to semiconductor auxiliary storage 9, the contents of the ID information stored in semiconductor auxiliary storage 9 are examined to determine if the correct ID information has been formatted (step 102). The ID information is track ID information which would normally be written in a magnetic auxiliary storage or memory means. It is the information necessary for BIOS 43 to translate the disk address to an address in semiconductor auxiliary storage 9. If the ID information has not been formatted, the address translation cannot be carried out and an error process is carded out (step 105) instead. The ID information will be explained in detail later. If the ID information has been correctly formatted, the disk address (cylinder number, surface number and sector number) is translated into an address in semiconductor auxiliary storage 9 based on the contents of the ID information stored in semiconductor auxiliary storage 9 (step 103), and input/output processing is carried out (step 104). The address translation in step 103 will be explained in detail later.

Using a discrimination function to determine whether or not BIOS 43 requests access to semiconductor auxiliary storage 9, and the address translation and input/output functions for semiconductor auxiliary storage 9 by reference to ID information, application software 41 and DOS 42 need not be concerned that semiconductor auxiliary storage 9 is employed as the auxiliary storage rather than conventional magnetic storage memory elements. It can be treated as if the floppy disk or the hard disk is employed as the auxiliary storage.

Figure 6:
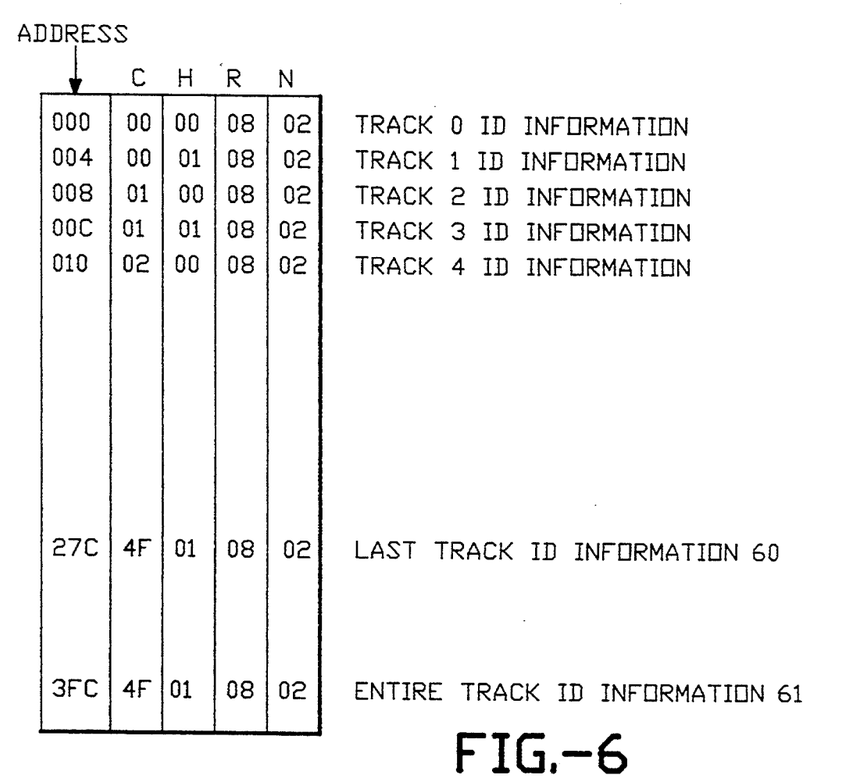
FIG. 6 illustrates a stored ID information.

Referring to FIG. 6, the track ID information for the magnetic storage is now explained. In this particular example, semiconductor auxiliary storage 9 is treated as a 640 KB floppy disk. FIG. 6 shows a format for the ID information stored in the first 1 KB area of semiconductor auxiliary storage 9. The ID information includes four bytes, one byte for each cylinder number (C), surface number (H), number of sectors (R) and length of a sector (N) for each track. The cylinder number (C) is usually written in an ID area in one sector of one track of a floppy disk, and the surface number (H) is also written in the ID area of the floppy disk. The surface number "00" indicates a front surface and "01" indicates a rear surface. The number of sectors (R) indicates the number of sectors in a track. In the present embodiment, the number of sectors is eight for each track. The sector length (N) indicates the sector length in accordance with a sector length code as shown in Table 1. Bit 7 indicates whether the disk is designated as single density or double density. In the present embodiment, each track is configured as single density and has 512 bytes.

TABLE 1

| N | 0 | 1 | 2 | 3 | 4 | 5 | 6 | 7 | 8 OR LONGER |
|---|---|---|---|---|---|---|---|---|---|
| SECTOR LENGTH | 128 | 256 | 512 | 1024 | 2048 | 4096 | 8192 | 16384 | 32768 |

In FIG. 6, numbers in the leftmost column indicate the top address of the ID information for the respective tracks. As many 4-byte ID information designations for the tracks are provided as are needed to match the number of tracks on virtual floppy disk, and entire track ID information 61 having the same data content as that of last track ID information 60 is stored in the last four bytes of the top 1 KB of memory. The top address (hexadecimal 27C in the present illustration) of last track ID information 60 can be calculated based on entire track ID information 61 using the following relationship:

$$(C \times 2 \times H) \times 4 \text{ Top Address}$$

By letting the cylinder number C=4F and the surface number H=1, the result is:

$$(4F \times 2 + 1) \times 4 = 27C$$

Figure 7:
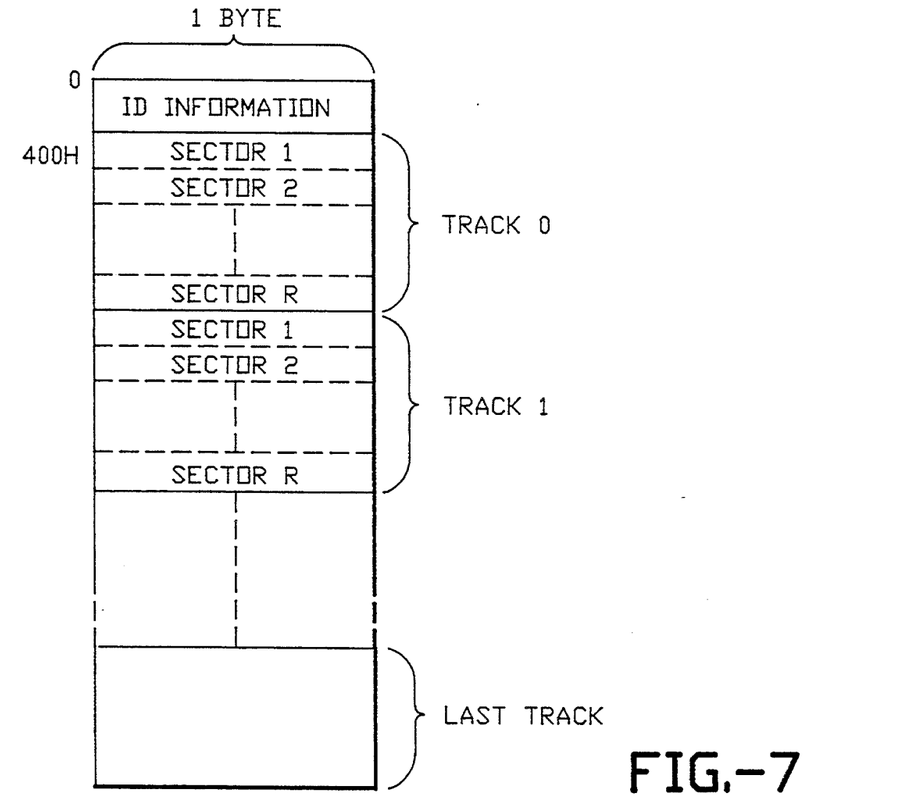
FIG. 7 is a memory space in the semiconductor auxiliary storage.

The translation from a standard disk address to an address on semiconductor auxiliary storage 9 is explained next. Memory space on semiconductor auxiliary storage 9 is allocated as shown in FIG. 7. The ID information shown in FIG. 6 is stored in the top 1 KB of the auxiliary memory and data is stored in subsequently designated areas in order of track number.

The translation of a disk address to an address on semiconductor auxiliary storage 9 by BIOS 43 is carried out in the following manner after verifying that ID information stored in the top 1 KB of semiconductor auxiliary storage 9 memory has been correctly formatted. First, based on parameters Ci and Hi relating to the cylinder number and the surface number, which are portions of the disk address delivered from the software interrupt INT1B$_H$, the top address of the ID information of the corresponding track is calculated according to the following relationship:

$$(Ci \times 2 + Hi) \times 4 \text{ Top Address}$$

For example, by setting Ci=1 and Hi=1, which represent the third track, the value "DOC" is obtained. Then, based on a parameter Ri relating to the sector number, which is also a portion of the disk address delivered from the software interrupt INT1B$_H$, the cylinder number (C), the surface number (H), the number of sectors (R) and the sector length (N) are all obtained by accessing the top address of the ID information which is calculated in accordance with the above relationships. An input/output address of semiconductor auxiliary storage 9 corresponding to the disk address is then calculated in accordance with one of the following relationships, (1) or (2):

$$DA = 400H + \{(C \times 2 + H) \times R + Ri - 1\} \times 128 \times 2^N \quad (1)$$

$$DA = 400H + (C \times 2 + H) \times R \times 128 \times 2^N \times 2 + (Ri - 1) \times 128 \times 2^N \quad (2)$$

Formula (1) applies to double density disks while formula (2) applies to single density disks. The single and double density disks can be distinguished using bit 7 of the sector length, as previously described.

In formulas (1) and (2), 400H (where H represents a hexadecimal number) indicates the top 1 KB in which the ID information is stored, $(C \times 2 + H)$ indicates the number of tracks positioned before the track in question, based on the assumption that there are two surfaces, $(C \times 2 + H)$. R indicates a sum of the number of sectors positioned before the track in question, and $128 \times 2^N$ indicates the sector length in bytes in accordance with Table 1. The difference between relationships (1) and (2) is that the number of sectors (R) for single density is one half that of double density.

In the present embodiment, semiconductor auxiliary storage 9 is employed as a floppy disk. It may also be employed as a hard disk in accordance with the same philosophy. In this latter case, the ID information for a hard disk is written into semiconductor auxiliary storage 9. When an access request to the hard disk is issued for BIOS 43, BIOS 43 accesses semiconductor auxiliary storage 9 to deliver the fetched data to DOS 42 or application software 41 as if it is the requested data from the hard disk.

Semiconductor auxiliary storage 9 is removable through use of connector 25 as explained in connection with FIG. 2. As a result, a semiconductor auxiliary storage of an appropriate capacity may be selectively loaded depending on the specific application. Usually, a hard disk has a larger capacity than a typical floppy disk. Thus, when semiconductor auxiliary storage 9 has a relatively large capacity it is employed as a hard disk and when semiconductor auxiliary storage 9 has a relatively small capacity it is employed as a floppy disk. In processing the software interrupt INT1B$_H$ of BIOS 43, whether the semiconductor auxiliary storage is to be treated as a hard or floppy disk is determined by the capacity of semiconductor auxiliary storage 9.

Figure 8:
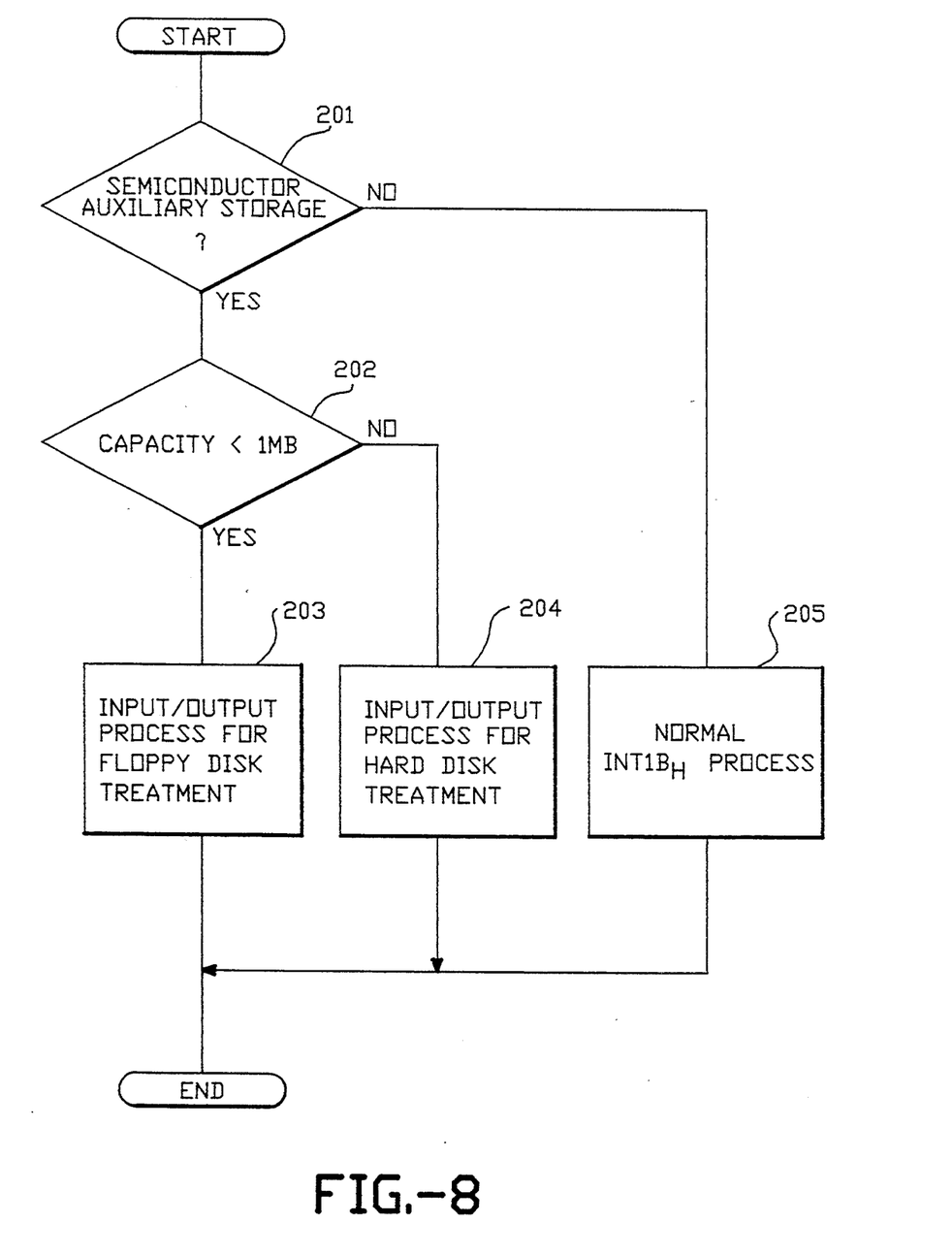
FIG. 8 is a flow chart of read and write processing for the BIOS to the software interrupt INT1B$_H$ from the DOS for selecting a processing procedure based on the capacity of the semiconductor auxiliary storage.

FIG. 8 is a flow chart of steps used in processing software interrupt INT1B$_H$ of BIOS 43. When application software 41 presents a file input/output request to DOS 42, DOS 42 issues the software interrupt INT1B$_H$ to BIOS 43. BIOS 43 determines which device the request was issued to in order to determine whether or not it is to semiconductor auxiliary storage 9 (step 201). If it is not to semiconductor auxiliary storage 9, then normal INT1B$_H$ processing is carried out (step 205) as is known in the art. If the interrupt request is directed to semiconductor auxiliary storage 9, the capacity thereof is examined to determine if it is less than 1 MB (step 202). If the capacity is less than 1 MB, an input/output process to treat semiconductor auxiliary storage 9 as a floppy disk is carded out (step 203). The step 203 in FIG. 8 corresponds to the process steps designated by dotted line box 110 of FIG. 5. In step 202, if the memory capacity is determined to be more than 1 MB, an input/output process is carded out to treat semiconductor auxiliary storage 9 as a hard disk (step 204).

Figure 9:
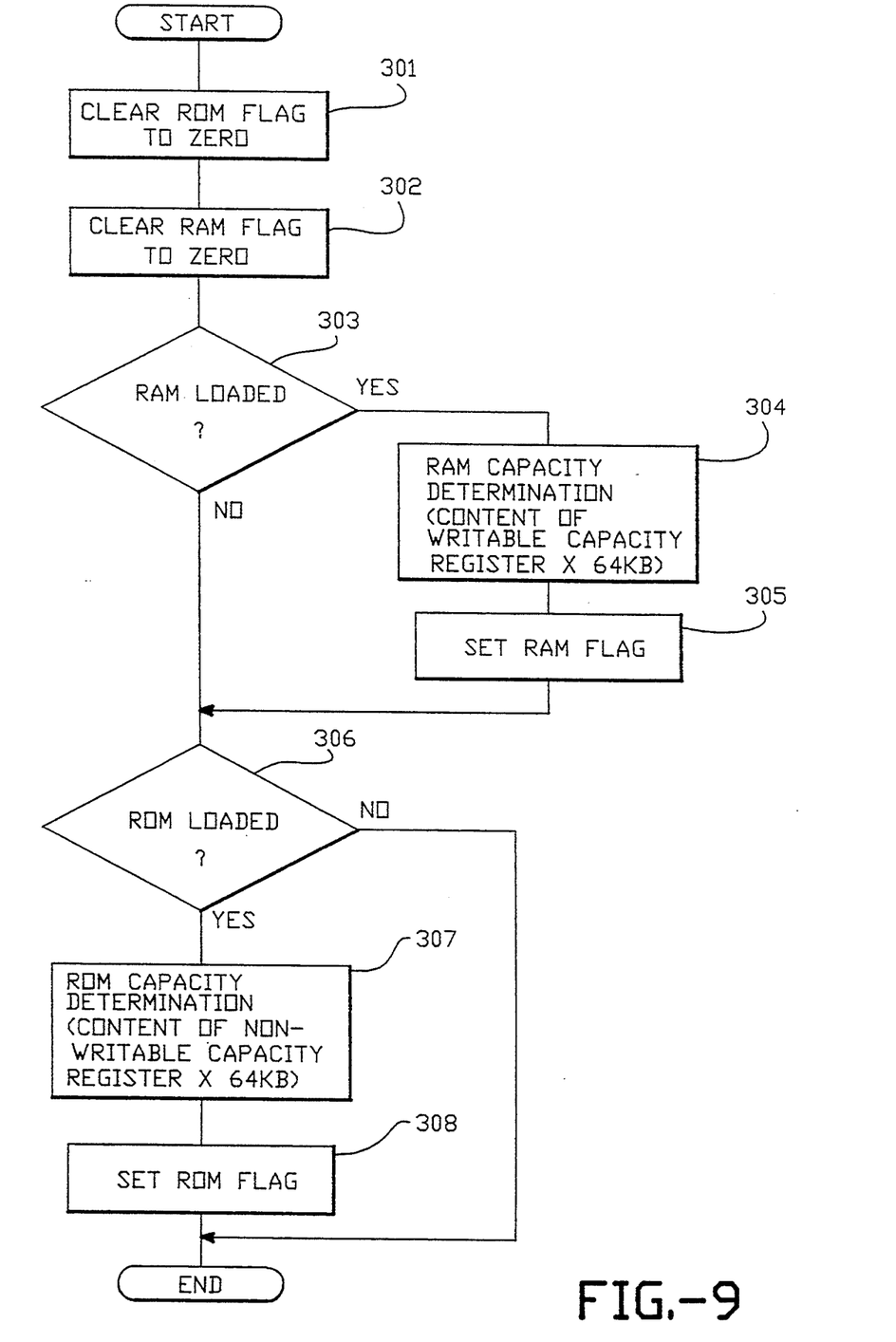
FIG. 9 is a flow chart of a process for determining a capacity for each memory type of semiconductor auxiliary storage.

FIG. 9 is a flow chart of steps used in determining the storage capacity by using the memory type for semiconductor auxiliary storage 9 which is determined in step 202 of FIG. 8. As a preliminary steps to determining the memory type, the flags for indicating the memory type, i.e., a ROM flag and a RAM flag are each cleared to zero (step 301 and 302). Then, a determination or examination is made as to whether or not the RAM contents have been loaded into semiconductor auxiliary storage 9 (step 303). If the RAM has been loaded, the RAM capacity is determined by an erase/write capacity register (step 304), as described in connection with FIG. 3B, and the RAM load flag is also set (step 305). The RAM capacity can be calculated by multiplying the contents of the erase/write capacity register by 64 KB. Then, the memory type register is again examined to determine whether the ROM contents have been loaded into semiconductor auxiliary storage 9 (step 306). If the ROM has been loaded, the capacity of a ROM is determined by the non erase/write capacity register (step 307), as described in connection with FIG. 3C, and a ROM load flag is also set (step 308). In this manner, the capacity for each memory type used in semiconductor auxiliary storage 9 can be ascertained.

When memory circuit 21 of semiconductor auxiliary storage 9 is configured as ROM only memory, it is not possible to store additional data prepared in information processing system 1. If auxiliary storage 9 is configured only as RAM memory, the stored data is destroyed when a back-up power system, such as a battery, becomes exhausted. Thus, those programs and data which are necessary as a minimum are stored in a ROM portion, and those programs and data modified during program execution are copied into RAM during system initialization. When semiconductor auxiliary storage 9 is thereafter employed, the copy area is accessed by translating a logical address to a target physical address. In this way, the minimum required programs and data originally written into auxiliary storage 9 and subsequently modified are not erased and any newly generated data may be additionally stored. This method of operation is now explained in more detail.

Figure 10A:
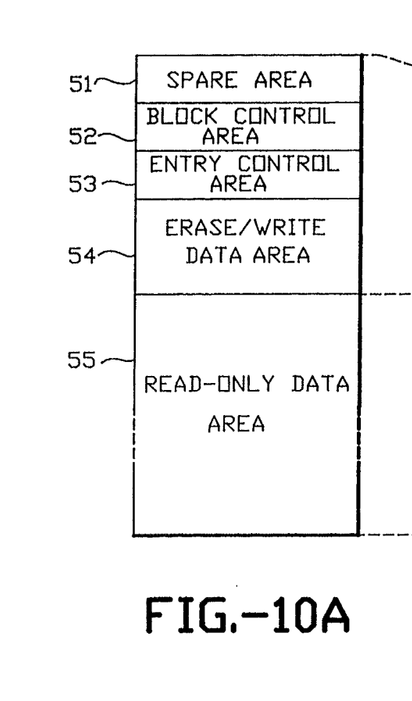
FIGS. 10A–10C illustrate a relationship among a data format, a memory type, and a logical address in the memory space of semiconductor auxiliary storage.
Figure 10B:
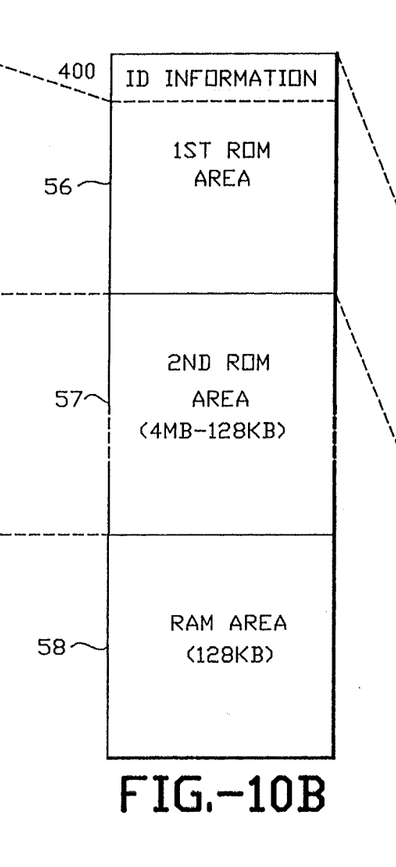
Figure 10C:
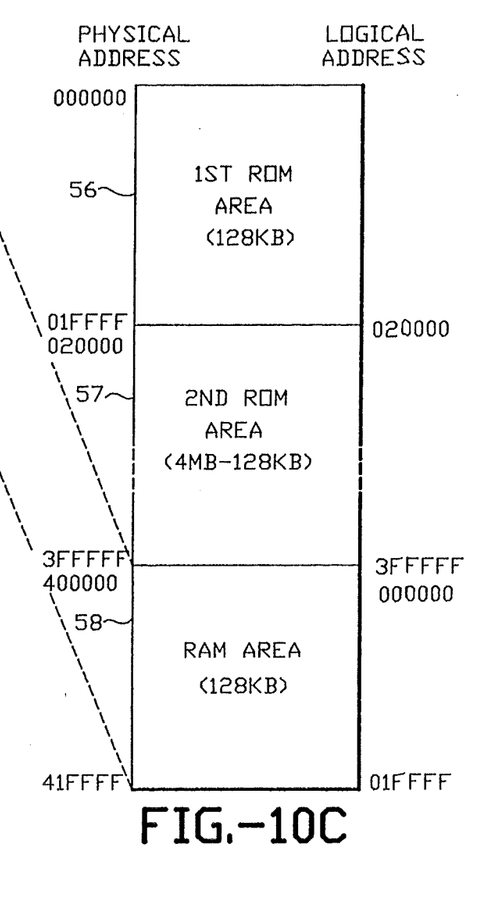

FIGS. 10A, 10B, and 10C illustrate the relationship among the data format, the memory type and the logical address of semiconductor auxiliary storage 9. FIG. 10A illustrates a data format for an OS and is specifically representative of the Microsoft MS-DOS operating sysem. FIGS. 10B and 10C show memory types associated with appropriate address locations.

The data format of FIG. 10A comprises a spare area 51, block control area 52, entry control area 53, and an erase/write data area 54 which should be located in the erase/write memory or RAM because its contents may be modified. On the other hand, data area 55, which need only be read, may be located in the ROM.

In FIG. 10B, programs and initial data for spare area 51, block control area 52, entry control area 53, and erase/write data area 54 have been previously stored in first ROM area 56, and the data for read-only data area 55 has been previously stored in second ROM area 57. ID information is stored in the top 1 KB of first ROM area 56. The data corresponding to RAM capacity is transferred from the ROM area to RAM area 58 so that the semiconductor auxiliary storage is initialized. A boundary for first ROM area 56 and second ROM area 57 is determined by the capacity of RAM area 58. A portion of the ROM area having the same capacity as RAM area 58, which is 128 KB here, is allotted from the top of the ROM area starting with first ROM area 56 and the remaining portion becomes second ROM area 57.

Figure 11:
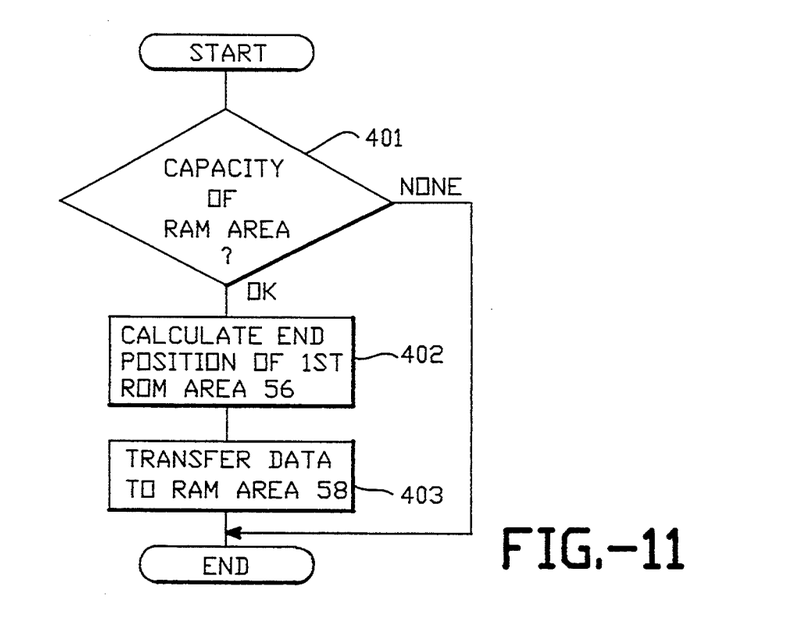
FIG. 11 is a flow chart of a copy process.

Initial program or data transfer is carried out by executing a copy load, or storage initialization program stored in BIOS ROM 3 using CPU 1. The copy mechanism comprises the copy program, CPU 1, and main storage 2. FIG. 11 shows a flow chart for this copy process. First, the capacity of RAM area 58 is determined (step 401) according to method previously described in connection with FIG. 9. When there is no RAM area 58, i.e., when the capacity of RAM area 58 is zero, no transfer is carried out and the process is terminated. After the capacity of RAM area 58 is determined, an end position of first ROM area 56 is calculated based on this capacity (step 402). Then, the data of first ROM area 56 is copied to RAM area 58 (step 403). Thus, the copy process is completed and semiconductor auxiliary storage 9 is initialized.

FIG. 10C shows the allocation of memory type as well as logical and physical addresses. The term logical address as used in the figure means an address which indicates a virtual logical space for the information processing system for semiconductor auxiliary storage 9 after initialization. The physical address means an address which indicates a physical space. Physically, a 4 MB ROM (first and second ROM areas 56 and 57) followed by 128 KB RAM 58 is used or created, but BIOS 43 treats this as if the 4 MB-128 KB second ROM area 57 exists or is positioned after 128 KB RAM area 58, as shown in the logical address column of FIG. 10C.

Figure 12:
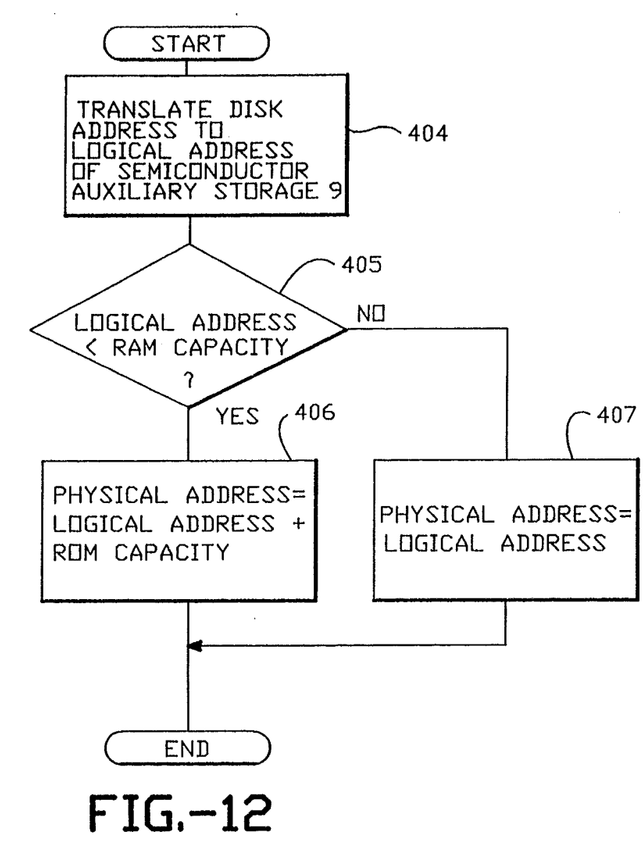
FIG. 12 is a flow chart of a translation process from a logical address to a physical address.

FIG. 12 illustrates a flow chart for steps used for converting a logical address to a physical address when BIOS 43 accesses the initialized semiconductor auxiliary storage 9 in response to a software interrupt INT1B$_H$ request to read and write data. First, the disk address is translated to a logical address for semiconductor auxiliary storage 9 (step 404). The method for translating the disk address to a logical address has already been explained in connection with FIG. 5 and it is omitted here. The translated address corresponds to the logical address shown on the right hand side of the memory space in FIG. 10C. Then, whether or not the translated logical address is smaller than the RAM capacity (indicated in bytes) is determined (step 405). In the example of the present embodiment, since the RAM capacity is 128 KB, whether or not the logical address is smaller than 128 KB is determined. In step 405, if the logical address is smaller than the RAM capacity, a sum of the logical address and the ROM capacity (total capacity of the first and second ROM areas) is employed as a real address or the physical address for semiconductor auxiliary storage 9 (step 406). Since the ROM capacity is 4 MB in the present embodiment, 4 MB is added to the logical address value. Accordingly, the logical address actually designates a point in RAM area 58. On the other hand, in step 405, if the logical address exceeds the RAM capacity, the logical address is employed as the physical address in its present form (step 407). This address designates a point in second ROM area 57.

In accordance with this method, the semiconductor auxiliary storage provides for the modification of basic programs and data while they are nonvolatily retained in memory. In the present embodiment, the logical address of RAM area 58 is smaller than the logical address of second ROM area 57, although the logical address of RAM area 58 may be arbitrarily selected. In this latter case, the translation algorithm from the logical address to the physical address needs to be appropriately modified.

Figure 13:
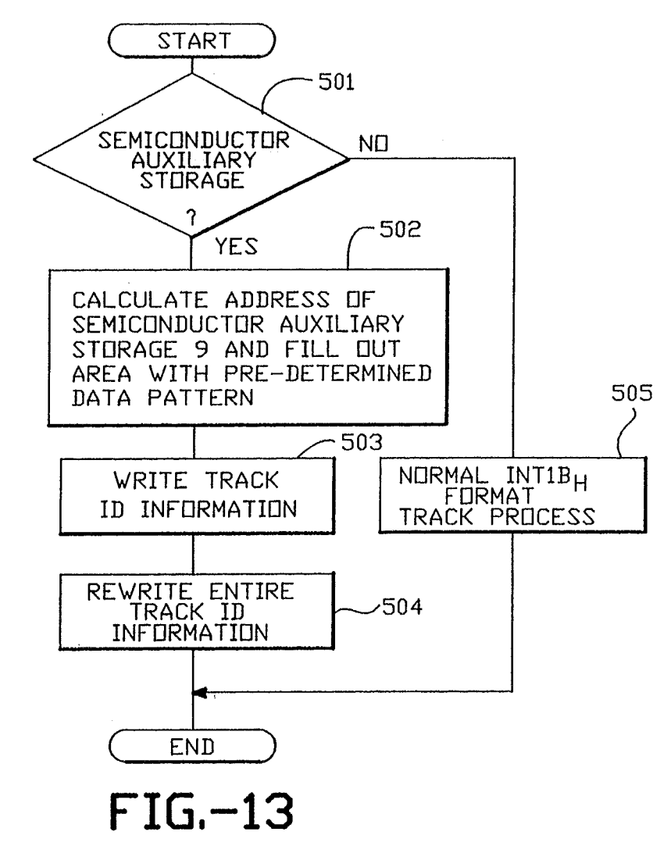
FIG. 13 is a flow chart of a format track process.

Attention is now directed to a track formatting process which is equivalent to a track formatting process for floppy disk and hard disk. For semiconductor auxiliary storage 9 having memory circuit 21, which is configured as RAM memory, and in which no information has been written, a format track process must be carried out. FIG. 13 is a flow chart of the steps used in the format track process as applied to one track. The format track process, however, is sequentially accomplished from track 0 through to the last track. In the case of track 0, when BIOS 43 receives a request for the format track process from DOS 42, BIOS 43 determines which device is associated with the request, and determines whether the request is to semiconductor auxiliary storage 9 or to other I/O devices, for example, expansion floppy disk 10 or expansion hard disk 11 (step 501). If the request is not directed to semiconductor auxiliary storage 9, a normal INT1B$_H$ format track process is carded out (step 505). If, on the other hand, the request is directed to semiconductor auxiliary storage 9, the address in semiconductor auxiliary storage 9 is calculated based on the disk address for track 0, and a memory area corresponding to a one-track capacity below the calculated address is filled using a predetermined data pattern. As an example, the memory space in FIG. 7 is located immediately after the ID information area, i.e., address 400. The data pattern, "E5" is usually employed for all words in entering the predetermined pattern. Thus, the area is filled by data containing no information. Then, the ID information of the track corresponding to the requested disk address (disk address indicating track 0) is written into the ID information area (step 503). As an example, the ID information area of FIG. 6 is written into the four-byte area (addresses 000 to 003). Then, the same data as that contained in the ID information on track 0 just written, is also written into the last four-byte area of the ID information area as the entire track ID information (step 504). With reference to the ID information area of FIG. 6 as an example, the ID information of track 0 is written into the area starting at address 3FC. Thus, the format track process for track 0 is completed and the format track process of track 1 is carded out next. The data area following the data area of track 0 is filled with "E5" data words, the ID information of the first track is written into the four-byte area following the ID information of track 0 and the entire track ID information of the area starting at address 3FC is rewritten as the ID information of the first track. The same process is repeated until the final track is reached and the format track process for the semiconductor auxiliary storage is then complete. In this manner, both DOS and application programs may be handled by semiconductor auxiliary storage 9 in the same manner as they are handled by hard disk or floppy disk memories.

Since the format track process is carried out in the manner described above, whether or not the formatting is normally done is determined by checking whether the entire track ID information coincides with the last track ID information. If the format process is interrupted and not carried out, normally the entire track ID information does not coincide with the last track ID information.

While the invention has been described in conjunction with specific embodiments, it will be evident to those skilled in the art that many further alternatives, modifications and variations are possible in light of the forgoing description. For example, Microsoft DOS is employed in the embodiment disclosed although the implementation of the present invention need not be limited to this or any other DOS type operating system. Further, the present invention is not limited to a BIOS for purposes of using software interrupt INT1B$_H$ but, for example, a disk input/output routine which inputs and outputs to and from semiconductor auxiliary storage 9 may be employed. Thus, the invention described herein is intended to embrace at such alternatives, modifications, applications and variations as

What is claimed is:

1. An information processing system having a CPU, a main storage for programs or data, and configured to access at least one semiconductor storage means, said information processing system comprising:
   auxiliary storage interface means for transferring data between said CPU and the semiconductor storage means and configured to access the semiconductor storage means;
   the semiconductor storage means connected to said auxiliary storage interface means, for receiving, storing, and retrieving data or programs;
   determination means, included in said semiconductor storage means and for outputting an attribute information of said auxiliary semiconductor storage means through said auxiliary storage interface means;
   Basic Input/Output Operating System (BIOS) storage means for storing a plurality of sub-programs for controlling said auxiliary storage interface means, wherein each of said plurality of sub-programs corresponds to the attribute information outputted by said determination means;
   detection means, coupled to said determination means, for selecting one of said sub-programs stored in said BIOS storage means in accordance with one of the attribute information outputted from aid determination means; and
   ID information storage means for storing ID information used by said BIOS storage means to initialize and configure said semiconductor storage means in one of a plurality of predetermined storage formats in accordance with the sub-program selected, wherein said system accesses said data incorporating with one of the predetermined storage formats in accordance with selected sub-program.

2. The information processing system of claim 1 wherein said BIOS storage means stores a program including an access request to said auxiliary semiconductor storage means.

3. The information processing system of claim 2 wherein said semiconductor storage means has a read-only memory and an erase/write memory, and said information processing system further comprises means for copying a portion of contents of said read-only memory to said erase/write memory.

4. The information processing system of claim 3 further comprising means for translating between physical addresses of source and target memory locations when access is made to said semiconductor storage means.

5. The information processing system of claim 2 wherein access to said semiconductor storage means is accomplished using translation means for translating an address for said BIOS storage means to an address for said semiconductor storage means.

6. A method for providing semiconductor type auxiliary storage for an information processing system having a CPU and a main program and data storage unit, the method comprising the steps of:

provided an auxiliary storage interface for transferring data between said CPU and auxiliary storage devices, said auxiliary storage interface being configured to access at least one auxiliary semiconductor storage device;

connecting at least one semiconductor memory device to said auxiliary storage interface for receiving, storing, and retrieving data or programs;

determining an attribute information of said at least one auxiliary semiconductor storage device through said auxiliary storage interface;

providing at least a portion of a Basic Input/Output Operating System (BIOS) in communication with both said CPU and said auxiliary storage interface for storing a plurality of sub-programs for controlling said auxiliary storage interface, wherein each of said plurality of sub-programs correspond to the attribute information determined in said determining step;

selecting one of said sub-programs stored in said BIOS for controlling said auxiliary storage interface in accordance with the attribute information determined in said determining step;

storing ID information comprising predetermined operating parameters for a plurality of storage formats corresponding to the attribute information detected in said determining step; and initializing said semiconductor memory device using said BIOS so as to configure said semiconductor memory device in one of a plurality of predetermined storage formats based upon the attribute information determined in said determining step, wherein the data is accessed incorporates one of the plurality of storage formats in accordance with said selected sub-program.

7. The method of claim 6 further comprising the steps of:

translating an address requested for said at least one auxiliary semiconductor storage device to a translated address of said at least one semiconductor memory device, when a data transfer is effected through said auxiliary storage interface; and accessing said at least one semiconductor memory device with the translated address.

* * * * *